(12) United States Patent
Kwak et al.

(10) Patent No.: US 11,619,333 B2
(45) Date of Patent: Apr. 4, 2023

(54) CONNECTING DEVICE FOR PIPING

(71) Applicant: ESSEN TECH CO., LTD., Gunsan-si (KR)

(72) Inventors: Ji Ho Kwak, Suwon-si (KR); Sang In Jang, Incheon (KR); Jin Myung Hong, Incheon (KR); Jung Hoon Choi, Incheon (KR); Ha Yeong Seong, Siheung-si (KR)

(73) Assignee: ESSEN TECH CO., LTD., Gunsan-si (KR)

(*) Notice: Subject to any disclaimer, the term of this patent is extended or adjusted under 35 U.S.C. 154(b) by 220 days.

(21) Appl. No.: 17/229,517

(22) Filed: Apr. 13, 2021

(65) Prior Publication Data

US 2022/0042636 A1 Feb. 10, 2022

(30) Foreign Application Priority Data

Aug. 10, 2020 (KR) .......................... 10-2020-0099853

(51) Int. Cl.
*F16L 37/23* (2006.01)

(52) U.S. Cl.
CPC ................................... *F16L 37/23* (2013.01)

(58) Field of Classification Search
CPC ..... F16L 37/23; F16L 37/091; F16L 37/0915; F16L 37/092; F16L 19/0212
See application file for complete search history.

(56) References Cited

U.S. PATENT DOCUMENTS

| 3,507,523 | A | * | 4/1970 | Cadley | F16L 37/23 |
| | | | | | 285/307 |
| 5,806,564 | A | * | 9/1998 | Wilcox | F16L 37/35 |
| | | | | | 137/614.04 |
| 2003/0006609 | A1 | * | 1/2003 | Yates | F16L 37/0915 |
| | | | | | 285/39 |
| 2012/0169039 | A1 | * | 7/2012 | Crompton | F16L 37/0915 |
| | | | | | 285/305 |
| 2014/0103637 | A1 | * | 4/2014 | Lu | F16L 37/38 |
| | | | | | 285/33 |

FOREIGN PATENT DOCUMENTS

| JP | 2003287181 | A | | 10/2003 | |
| JP | 2012017817 | A | | 1/2012 | |
| KR | 2020000010261 | U | | 6/2000 | |
| KR | 1020170112081 | A | | 10/2017 | |
| KR | 102039135 | B1 | | 10/2019 | |
| WO | WO-2009107788 | A1 | * | 9/2009 | ............. F16L 37/23 |
| WO | WO-2020162143 | A1 | * | 8/2020 | ............... F16F 1/06 |

* cited by examiner

*Primary Examiner* — Zachary T Dragicevich
*Assistant Examiner* — James A Linford
(74) *Attorney, Agent, or Firm* — Rabin & Berdo, P.C.

(57) ABSTRACT

A connecting device for piping is disclosed. The connecting device for piping includes a connecting device body having therein ball insertion holes, balls inserted into the ball insertion holes so as to come into close contact with the outer surface of a pipe, a locking cap including a locking cap body movably coupled to the connecting device body and a pressing rim portion pressing the balls, a locking cap spring pressing the locking cap toward the position at which the locking cap contacts the balls, a stopper cap movably coupled to the connecting device body so as to limit movement of the locking cap, a plunger including a plunger body, a plunger tube inserted into the pipe, and a packing disposed on the periphery of the plunger tube so as to come into contact with the pipe, and a plunger spring pressing the plunger toward the pipe.

6 Claims, 12 Drawing Sheets

CONNECTING DEVICE FOR PIPING

BACKGROUND OF THE INVENTION

Field of the Invention

The present invention relates to a connecting device for piping, and more particularly to a connecting device for piping, which enables convenient connection of pipes that constitute a piping structure for conveying various kinds of fluid.

Description of the Related Art

In general, a piping structure is used for conveyance of fluid in various devices or facilities, from various machines to household or large-scale industrial facilities, which require the supply of fluid thereto. Such a piping structure is typically composed of a plurality of pipes interconnecting a fluid supply part and a fluid-using part.

Because pipes are manufactured to specific standard sizes to facilitate transport, handling, and the like, when it is desired to form a piping structure to a length greater than the standard length of each pipe or to form a bent piping structure, various types of pipe-connecting devices are used to connect pipes to each other. As examples of pipe-connecting devices, there are elbows, T-shaped joints, sockets, and couplings.

As examples of pipes constituting a piping structure, there are copper pipes, stainless steel pipes, synthetic resin pipes, and pipes made of various other materials, which are selectively used depending on the type of fluid that flows through the piping structure. Various connection methods are selectively used depending on the type of pipe.

Pipe connection methods include a flange-coupling method, in which pipes are connected to each other using flanges formed at the ends of pipes that are adjacent to each other, a coupling-connection method, in which pipes are connected to each other by inserting the ends thereof into a corresponding coupling, a thread-engagement method, in which pipes are threadedly engaged with each other using threads formed at the ends of pipes that are adjacent to each other, a band-connection method, in which the ends of pipes are connected to each other using a stainless band, and an electric-fusion-connection method, in which the ends of pipes to be connected are fused to each other using a mesh-type hot wire.

In addition, a flare-connection method or a brazing method is used for a piping structure in which a high-pressure fluid such as a refrigerant is to be conveyed.

A flare-connection method is performed in the manner of forming an expanded-pipe portion at the end of a pipe through plastic working using a jig, placing the expanded-pipe portion on a tapered portion of a joint body, and fastening a cap nut such that the expanded-pipe portion is press-fitted between a tapered surface of the cap nut and the tapered portion of the joint body, thereby securing airtightness. A brazing method is a method in which the end of a pipe is inserted into an expanded-pipe portion of another pipe and is heated using a torch so that the two pipes are connected to each other.

However, these conventional pipe connection methods are cumbersome, time-consuming, and difficult for laypersons who are not skilled in the art to carry out.

RELATED ART DOCUMENT

Patent Document (Patent Document 1) Korean Unexamined Utility Model Publication No. 2000-0010261 (Jun. 15, 2000)

SUMMARY OF THE INVENTION

Therefore, the present invention has been made in view of the above problems, and it is an object of the present invention to provide a connecting device for piping enabling rapid and convenient connection between pipes or between a pipe and another constituent part of piping.

However, the objects to be accomplished by the present invention are not limited to the above-mentioned object, and other objects not mentioned herein will be clearly understood by those skilled in the art from the following description.

In accordance with the present invention, the above and other objects can be accomplished by the provision of a connecting device for piping configured to connect a pipe to another pipe or to another constituent part of piping, the connecting device for piping including: a connecting device body having a hollow structure, the connecting device body including a passage formed therein to allow a fluid to pass therethrough and a plurality of ball insertion holes formed in one end thereof; a plurality of balls inserted into the ball insertion holes such that a portion of each of the plurality of balls protrudes to the interior of the connecting device body, each of the plurality of balls having a size that does not allow the plurality of balls to completely pass through the ball insertion holes so that the plurality of balls comes into close contact with the outer surface of a pipe that is coupled to the one end of the connecting device body; a locking cap including a locking cap body having a hollow structure that surrounds a portion of the connecting device body and is movably coupled to the connecting device body and a pressing rim portion formed inside the locking cap body so as to press the plurality of balls toward the interior of the connecting device body; a locking cap spring mounted in the connecting device body to press the locking cap toward a position at which the locking cap contacts the plurality of balls; a stopper cap movably coupled to the connecting device body while surrounding a portion of the connecting device body so as to limit movement of the locking cap through contact with the locking cap; a plunger including a plunger body having a hollow structure that is movably disposed in the connecting device body, a plunger tube protruding from the plunger body so as to be inserted into a pipe that is coupled to the one end of the connecting device body, and a packing disposed on the periphery of the plunger tube so as to come into contact with an end of the pipe; and a plunger spring mounted in the connecting device body to press the plunger toward the pipe that is coupled to the one end of the connecting device body.

The stopper cap may be threadedly engaged with the connecting device body.

The connecting device for piping according to the present invention may further include a sealing member disposed on the periphery of the plunger tube to seal a gap between the pipe that is coupled to the plunger tube and the connecting device body. The connecting device body may have therein a sealing member seating portion that is formed so as to be gradually narrowed in a direction approaching the one end of the connecting device body so that the sealing member is caught thereon in order to prevent the sealing member from being pushed toward the one end of the connecting device body.

The connecting device body may include a first body, configured to allow the plurality of balls, the locking cap, the locking cap spring, the stopper cap, and the plunger to be coupled thereto, and a second body coupled to an end of the first body, the second body being configured to allow a fixing unit, configured to fix the other pipe or the other constituent part of piping to the connecting device body, to be coupled thereto.

The fixing unit may be mounted to the other end of the connecting device body to fix the other pipe or the other constituent part of piping to the connecting device body. The fixing unit may include: a fixing cap having a fixing cap through-hole formed therein to allow the other pipe or the other constituent part of piping to pass therethrough, the fixing cap being fixed to the connecting device body; a sealing member disposed in the connecting device body so as to be in contact with the outer surface of the other pipe or the other constituent part of piping; a grip ring disposed in the connecting device body, the grip ring including a plurality of latching pieces formed so as to be elastically deformed by contact with the outer surface of the other pipe or the other constituent part of piping in order to fix the other pipe or the other constituent part of piping to the connecting device body; and a release tube having a release tube through-hole formed therein to allow the other pipe or the other constituent part of piping to pass therethrough, the release tube being movably inserted into the fixing cap through-hole so as to press the plurality of latching pieces in a direction moving away from the outer surface of the other pipe or the other constituent part of piping.

The release tube may include a release tube body and a pressing portion formed at one end of the release tube body, the pressing portion being gradually reduced in diameter in a direction moving away from the release tube body so as to press the plurality of latching pieces.

The release tube may further include a latching portion protruding from the outer surface of the release tube body, and the fixing cap may include therein a fixing cap stepped portion on which the latching portion is caught so that the release tube is prevented from being separated from the fixing cap.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
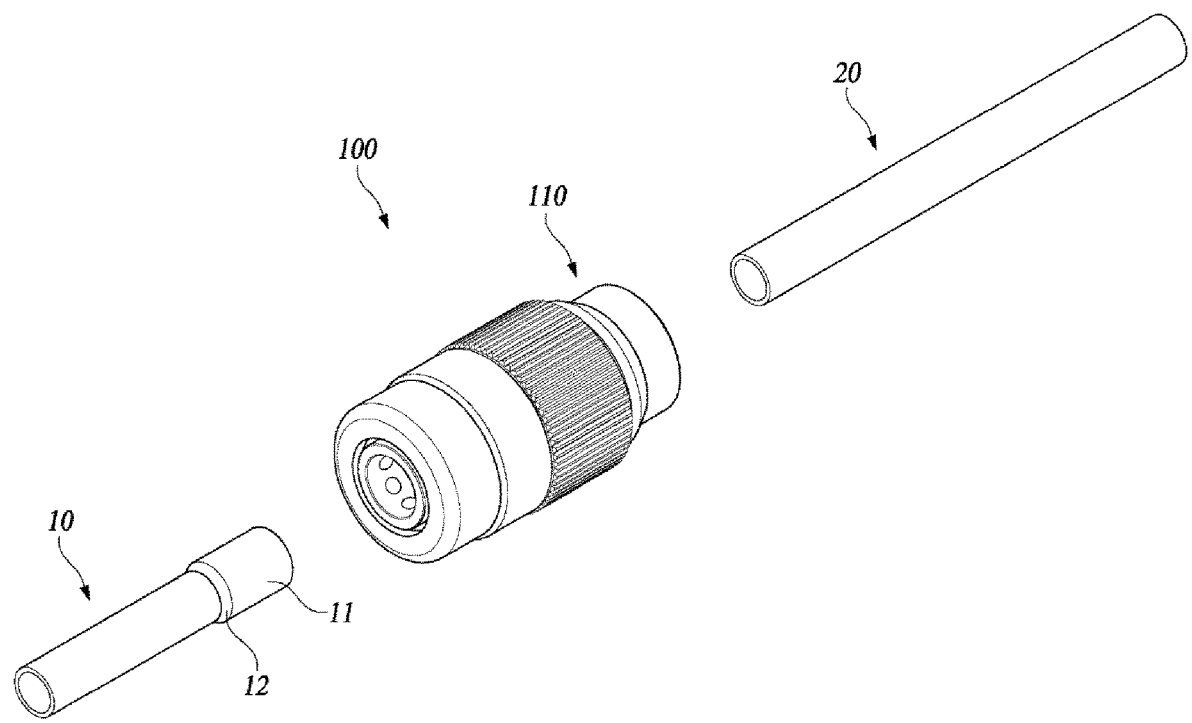
FIGS. 1 and 2 are perspective views showing a connecting device for piping according to an embodiment of the present invention.
Figure 2:
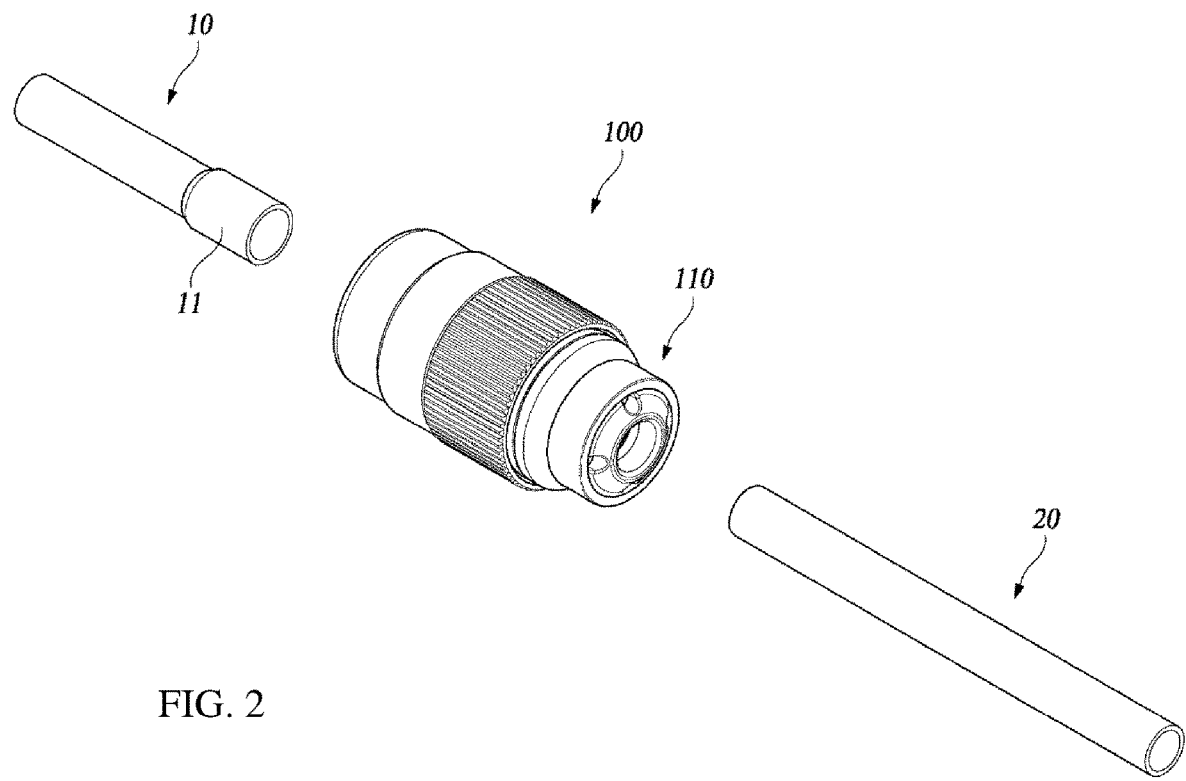
Figure 3:
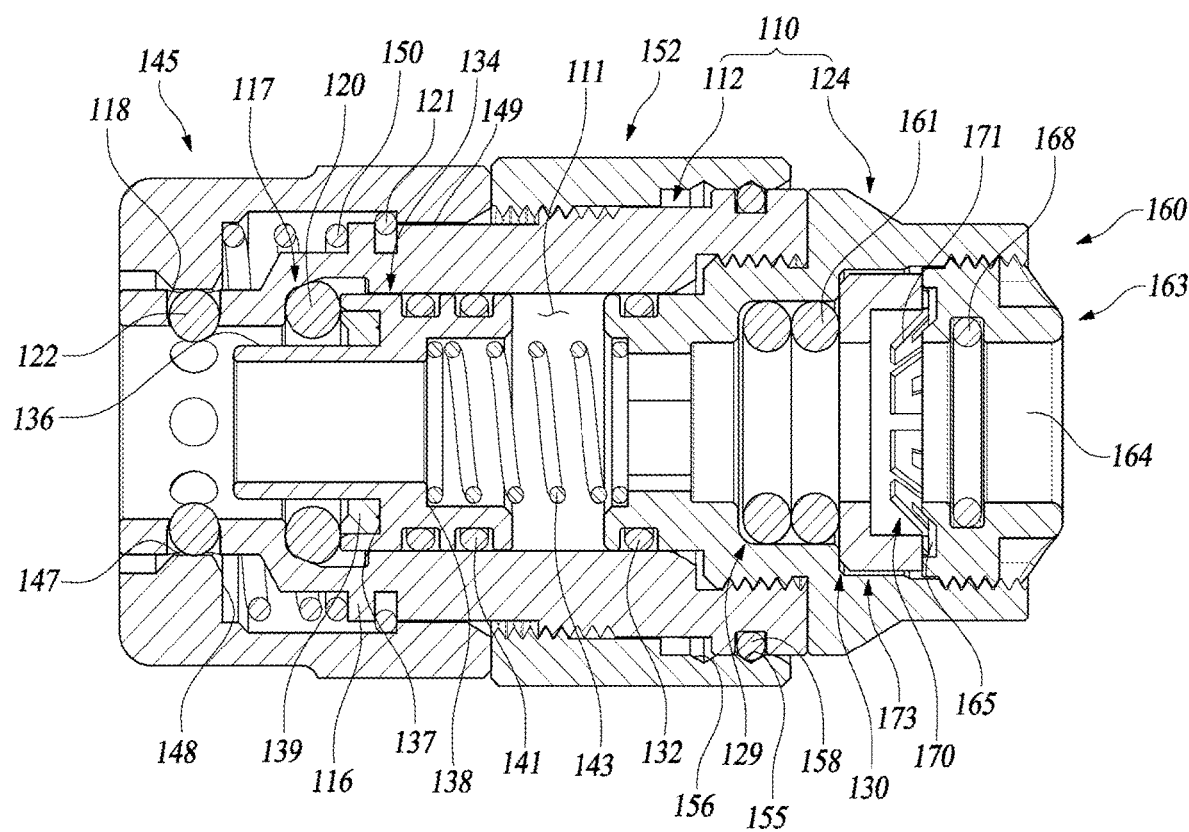
FIG. 3 is a cross-sectional view showing a connecting device for piping according to an embodiment of the present invention.
Figure 4:
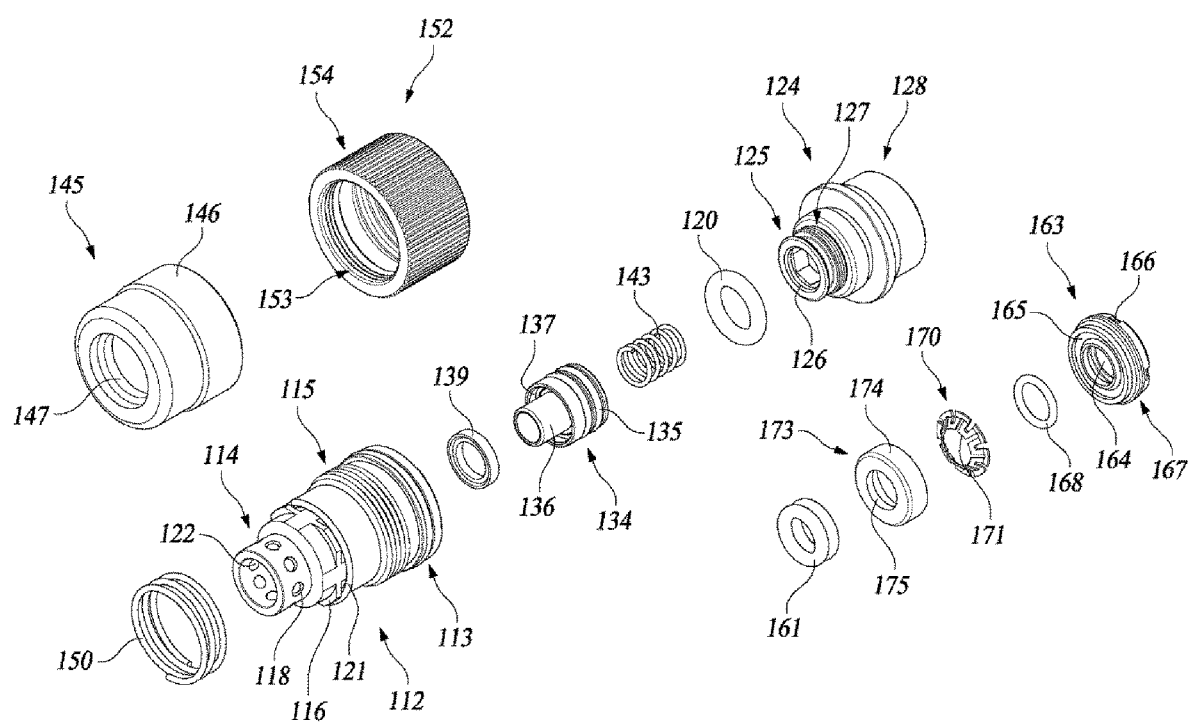
FIGS. 4 and 5 are exploded perspective views showing a connecting device for piping according to an embodiment of the present invention.
Figure 5:
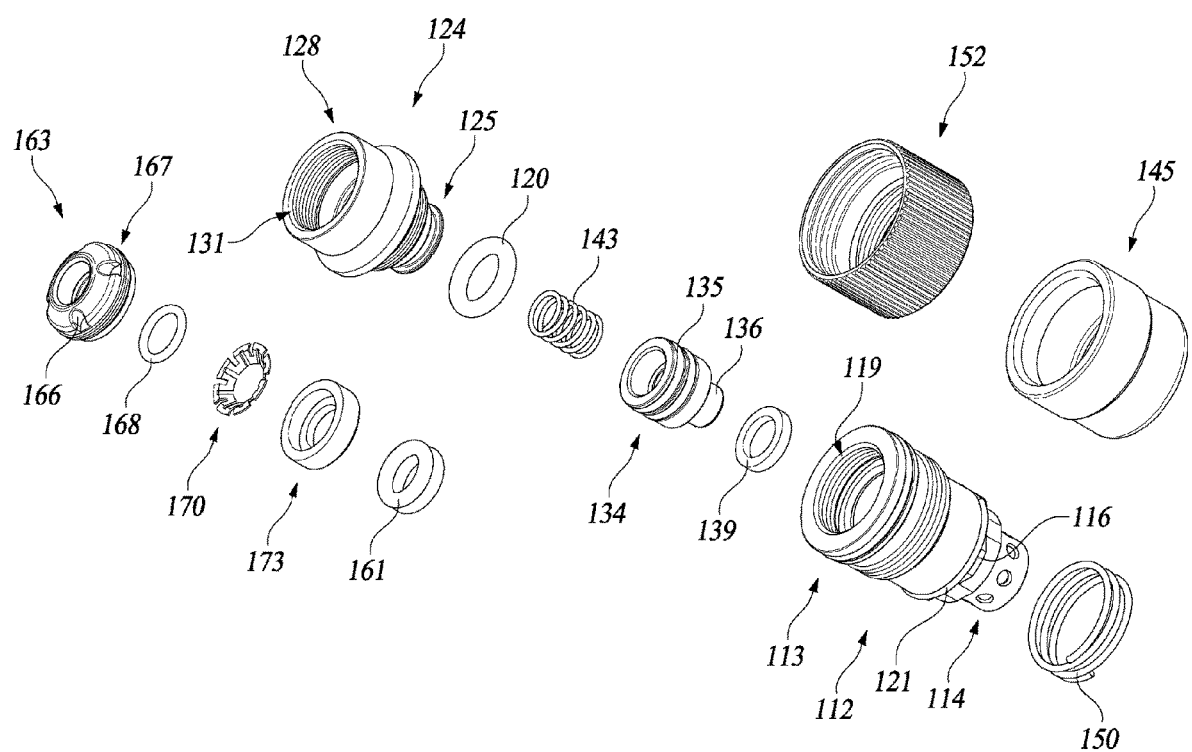

Hereinafter, embodiments of the present invention will be described in detail with reference to the accompanying drawings so that those skilled in the art to which the present invention pertains may easily carry out the embodiments. The present invention may, however, be embodied in many different forms, and should not be construed as being limited to the embodiments set forth herein.

In the drawings, the sizes or shapes of components may be exaggerated or schematically illustrated for clarity and convenience of description.

Also, the terms used in the following description are terms defined taking into consideration the functions obtained in accordance with the present invention, and may be changed in accordance with the option of a user or operator or a usual practice. Therefore, the definitions of these terms should be determined based on the total content of this specification.

A description of parts unrelated to the technical spirit of the present invention is omitted in order to clearly and briefly describe the present invention, and the same or extremely similar components are denoted by the same reference numerals throughout the specification.

In addition, in several exemplary embodiments, components having the same configuration will be representatively described using the same reference numerals in an exemplary embodiment, and only components different from those of an exemplary embodiment will be described in the other exemplary embodiments.

Throughout the specification, when an element is said to be "connected", "coupled", or "joined" to another element, the element and the other element may be "directly connected", "directly coupled", or "directly joined" to each other, or may be "indirectly connected", "indirectly coupled", or "indirectly joined" to each other with one or more intervening elements interposed therebetween. In addition, throughout the specification, when an element is referred to as "comprising", "including", or "having" another element, the element should not be understood as excluding other elements, so long as there is no special conflicting description, and the element may include at least one other element.

As shown in FIGS. 1 to 5, a connecting device 100 for piping according to an embodiment of the present invention includes a connecting device body 110 having a hollow structure, a plunger 134, which is disposed in the connecting device body 110 so as to be coupled to a pipe 10 that is connected to one end of the connecting device body 110, a locking cap 145, which is coupled to the outer periphery of the connecting device body 110, a stopper cap 152, which is coupled to the outer periphery of the connecting device body 110, and a fixing unit 160, which is mounted in the connecting device body 110 in order to fix another pipe or a constituent part of piping that is connected to the other end of the connecting device body 110. The connecting device 100 for piping may connect the pipe 10 to another pipe or another constituent part of piping.

Hereinafter, the connecting device 100 for piping according to an embodiment of the present invention will be described as connecting the pipe 10, which has an expanded end, to another pipe 20 by way of example.

The connecting device body 110 has a hollow structure in which a passage 111 is formed to allow fluid to flow therethrough. The connecting device body 110 includes a first body 112, to which the pipe 10 is coupled, and a second body 124, to which the other pipe 20 is coupled.

The first body 112 has a hollow structure in which a hole defining the passage 111 is formed. The first body 112 includes a body-connecting portion 113, which is coupled to the second body 124, and a pipe-connecting portion 114, to which the pipe 10 is coupled.

The body-connecting portion 113 has a first body outer threaded portion 115 formed on the outer circumferential surface thereof so as to be threadedly engaged with the stopper cap 152. The pipe-connecting portion 114 has a first body latching protrusion 116 formed on the outer periphery thereof. The first body latching protrusion 116 supports a locking cap spring 150 and a separation prevention ring 121. The locking cap spring 150 serves to resiliently support the locking cap 145, and the separation prevention ring 121 serves to prevent the locking cap 145 from being separated from the first body 112. The body-connecting portion 113 has a first body inner threaded portion 119 formed on the inner circumferential surface thereof so as to be threadedly engaged with the second body 124.

A sealing member seating portion 117 is formed in the pipe-connecting portion 114. A sealing member 120 is seated on the sealing member seating portion 117 in order to seal a gap between the pipe 10 and the first body 112. The sealing member seating portion 117 is formed so as to be gradually narrowed in a direction approaching an end of the first body 112 so that the sealing member 120 is caught thereon. Since the sealing member 120 is caught on the sealing member seating portion 117, the sealing member 120 is prevented from being pushed toward the end of the first body 112, and is capable of stably sealing a gap between the pipe 10 and the first body 112. In addition, the pipe-connecting portion 114 has a plurality of ball insertion holes 118 formed in an end thereof. The ball insertion holes 118 are arranged along the periphery of the pipe-connecting portion 114 so as to be spaced apart from each other with a regular interval therebetween.

Balls 122 are inserted into the respective ball insertion holes 118. The balls 122 may be inserted into the ball insertion holes 118 such that a portion of each ball protrudes to the interior of the first body 112. The balls 122 are formed to have a size that does not allow the balls 122 to completely pass through the ball insertion holes 118. The balls 122 are inserted into the ball insertion holes 118 from the outside of the first body 112. The balls 122 protrude to the interior of the first body 112 and tightly press the outer surface of the pipe 10 inserted into the first body 112, thereby fixing the pipe 10 so that the pipe 10 is prevented from being separated from the first body 112.

The second body 124 is coupled to an end of the first body 112. The second body 124 has a hollow structure in which a hole defining the passage 111 is formed. The second body 124 includes an insertion portion 125, which is inserted into the first body 112, and a body end portion 128, which extends from the insertion portion 125 so as to be disposed outside the first body 112. The insertion portion 125 has an insertion portion stepped portion 126 formed in an end thereof. The insertion portion stepped portion 126 may support a plunger spring 143, which applies elastic force to the plunger 134. The insertion portion 125 has a second body outer threaded portion 127 formed on the outer circumferential surface thereof so as to mesh with the first body inner threaded portion 119 of the first body 112. The second body 124 may be secured to the first body 112 in a manner such that the second body outer threaded portion 127 is threadedly engaged with the first body inner threaded portion 119. A sealing member 132 is provided on the periphery of the insertion portion 125 in order to seal a gap between the first body 112 and the second body 124.

The second body 124 has a sealing member seating portion 129 and a sleeve seating portion 130 formed therein. A sealing member 161 of the fixing unit 160 is seated on the sealing member seating portion 129. The sealing member 161 is seated on the sealing member seating portion 129, and seals a gap between the other pipe 20 and the second body 124. In order to prevent the sealing member 161 from being pushed toward the plunger 134, the sealing member seating portion 129 has a width corresponding to the width of the sealing member 161. The sleeve seating portion 130 is a portion on which a sleeve 173 of the fixing unit 160 is seated, and has a width corresponding to the width of the sleeve 173. The second body 124 has a second body inner threaded portion 131 formed on the inner circumferential surface thereof in order to fix a fixing cap 163 of the fixing unit 160.

The connecting device body 110 may be modified to realize any of various external appearances and internal structures other than the structure including the first body 112 and the second body 124 shown in the drawings.

The plunger 134 is movably mounted in the connecting device body 110 so as to contact an end of the pipe 10 that is coupled to one end of the connecting device body 110. The plunger 134 includes a hollow plunger body 135, a plunger tube 136 protruding from the plunger body 135, and a packing 139 disposed on the periphery of the plunger tube 136. The plunger tube 136 is inserted into the pipe 10 and communicates therewith so that fluid is capable of flowing through the pipe 10 and the plunger tube 136. A ring-shaped plunger groove 137 is formed in one end of the plunger body 135, at which the plunger tube 136 is disposed, so as to surround the plunger tube 136. The packing 139 is inserted into the plunger groove 137. The plunger tube 136 has a plunger stepped portion 138 formed therein to support the plunger spring 143. A sealing member 141 is disposed on the outer surface of the plunger body 135. The sealing member 141 seals a gap between the first body 112 and the plunger body 135. The packing 139 is made of an elastic material so as to be pressed by the end of the pipe 10.

When the pipe 10 is inserted into the first body 112, the plunger tube 136 is inserted into the pipe 10, and the packing 139 is brought into close contact with the end of the pipe 10. In addition, the sealing member 120 disposed on the periphery of the plunger tube 136 is brought into close contact with the outer surface of the pipe 10. Accordingly, a gap between the pipe 10 and the plunger 134 may be reliably sealed, and a gap between the pipe 10 and the first body 112 may be reliably sealed. In addition, since a gap between the plunger 134 and the first body 112 is sealed by the sealing member 141, the connection state between the pipe 10 and the connecting device 100 for piping may be maintained without the leakage of fluid. Since the plunger 134 is coupled to the pipe 10, which is inserted into the connecting device body 110, the fluid flowing through the pipe 10 may be guided to the passage 111 in the connecting device body 110 without leaking. In addition, when the fluid flows into the connecting device body 110 from the other pipe 20, the plunger 134 may guide the fluid flowing through the passage 111 to the pipe 10 while preventing the leakage of fluid.

The plunger 134 is resiliently supported by the plunger spring 143 mounted in the connecting device body 110. The plunger spring 143 is supported at one end thereof by the insertion portion stepped portion 126 of the second body 124, and is in contact at the other end thereof with the plunger stepped portion 138 of the plunger 134, thereby applying elastic force to the plunger 134 toward the pipe 10. Accordingly, the plunger 134 may be stably maintained in the state of being tightly pressed to the end of the pipe 10.

The plunger 134 may be modified into any of various structures other than the structure shown in the drawings, so long as it is coupled to the pipe 10, which is inserted into the connecting device body 110, so as to connect the pipe 10 to the connecting device body 110 while preventing the leakage of fluid. Further, the structure or the mounting position of the plunger spring 143 may also be variously changed.

The locking cap 145 is movably coupled to the first body 112 while surrounding a portion of the first body 112 so as to limit the movement of the balls 122. The locking cap 145 includes a hollow locking cap body 146 and a pressing rim portion 147 formed inside the locking cap body 146. The pressing rim portion 147 is formed in a ring shape inside the locking cap body 146 so as to press the balls 122 toward the interior of the connecting device body 110. When the pressing rim portion 147 is placed at a position facing the balls 122, the locking cap 145 may press the balls 122 toward the interior of the connecting device body 110, thereby fixing the balls 122 so that the balls 122 are immovable. When the locking cap 145 is pushed toward the other end of the connecting device body 110 and thus the pressing rim portion 147 is separated from the balls 122, the balls 122 may be pushed in the outward direction of the connecting device body 110. The locking cap 145 has a locking cap stepped portion 148 and an inner rim portion 149 formed therein. The inner rim portion 149 is formed in a ring shape inside the locking cap body 146. The inner rim portion 149 may protrude toward the interior of the locking cap body 146 and may be caught on the separation prevention ring 121. Accordingly, the locking cap 145 may be caught on the separation prevention ring 121, and thus may not be easily separated from the first body 112.

The locking cap 145 is resiliently supported by the locking cap spring 150 disposed outside the connecting device body 110. The locking cap spring 150 is supported at one end thereof by the first body latching protrusion 116 of the first body 112 and is in contact at the other end thereof with the locking cap stepped portion 148 of the locking cap 145. The locking cap spring 150 presses the locking cap 145 toward the position at which the locking cap 145 contacts the balls 122. Accordingly, unless some other external force is applied to the locking cap 145, the locking cap 145 may be continuously located at a position at which the locking cap 145 limits the movement of the balls 122.

The locking cap 145 may be modified into any of various structures other than the structure shown in the drawings, so long as it is movably coupled to the connecting device body 110 and limits the movement of the balls 122. Further, the structure or the mounting position of the locking cap spring 150 may also be variously changed.

The stopper cap 152 is movably coupled to the connecting device body 110 while surrounding a portion of the connecting device body 110 such that one end thereof faces the end of the locking cap 145. Since the stopper cap 152 is in contact with the locking cap 145, it is possible to limit the movement of the locking cap 145. The stopper cap 152 has a stopper cap threaded portion 153 formed on the inner circumferential surface thereof so as to mesh with the first body outer threaded portion 115 of the first body 112. The stopper cap 152 may be threadedly engaged with the first body 112 so as to move in a threaded manner. The stopper cap 152 has a textured portion 154 formed on the outer circumferential surface thereof so as to prevent slippage in a user's hand.

An O-ring 158 is interposed between the connecting device body 110 and the stopper cap 152. The stopper cap 152 has two stopper cap grooves 155 and 156 formed in the inner circumferential surface thereof. The two stopper cap grooves 155 and 156 are arranged so as to be spaced apart from each other in the direction in which the stopper cap 152 moves. When the stopper cap 152 is located at a position contacting the locking cap 145, the O-ring 158 may be inserted into one 155 of the two stopper cap grooves. When the stopper cap 152 is located at a position spaced a predetermined distance apart from the locking cap 145, the O-ring 158 may be inserted into the other one 156 of the two stopper cap grooves.

The stopper cap 152 may be moved away from or toward the locking cap 145 by the user's manipulation. In the state in which the stopper cap 152 is separated from the locking cap 145, the locking cap 145 is capable of moving to a position at which the locking cap 145 does not limit the movement of the balls 122. In the state in which the stopper cap 152 is in contact with the locking cap 145, the locking cap 145 is not capable of moving, and is thus maintained in the state of limiting the movement of the balls 122. The user may bring the stopper cap 152 into contact with the locking cap 145 by moving the stopper cap 152 to a position at which the O-ring 158 is inserted into one 155 of the two stopper cap grooves. Also, the user may withdraw the stopper cap 152 away from the locking cap 145 to a position at which the O-ring 158 is inserted into the other one 156 of the two stopper cap grooves, thereby securing a space in which the locking cap 145 is capable of moving to a position separated from the balls 122.

The stopper cap 152 may be modified into any of various structures other than the structure shown in the drawings, so long as it is movably coupled to the connecting device body 110 and limits the movement of the locking cap 145.

The fixing unit 160 is mounted to the second body 124 so as to fix the other pipe 20 to the connecting device body 110. The fixing unit 160 includes the sealing member 161, the fixing cap 163, and the sleeve 173 described above, and further includes a grip ring 170.

The fixing cap 163 has a hollow structure in which a fixing cap through-hole 164, through which the other pipe 20 passes, is formed. The fixing cap 163 has a seating groove 165 formed in an end thereof to allow a portion of the grip ring 170 to be inserted thereinto. The fixing cap 163 may be coupled to the other end of the connecting device body 110, and may fix the grip ring 170 so that the grip ring 170 is not capable of moving within the second body 124.

The fixing cap 163 has a plurality of fixing cap recesses 166 formed in the outer surface thereof. The fixing cap recesses 166 are arranged in the circumferential direction of the fixing cap 163 so as to be spaced apart from each other with a regular interval therebetween. A manipulation tool for fixing the fixing cap 163 to the second body 124 may be inserted into the fixing cap recesses 166.

The fixing cap 163 has a fixing cap threaded portion 167 formed on the outer surface thereof so as to mesh with the second body inner threaded portion 131 of the connecting device body 110. The fixing cap 163 may be threadedly engaged with the connecting device body 110. A sealing member 168 is provided in the fixing cap 163 in order to seal a gap between the fixing cap 163 and the other pipe 20.

The grip ring 170 is mounted in the second body 124 in order to fix the other pipe 20 inserted into the second body 124 so that the other pipe 20 is not separated from the connecting device body 110. The grip ring 170 includes a plurality of latching pieces 171 formed so as to be elastically deformed by contact with the outer circumferential surface of the other pipe 20. The latching pieces 171 are connected to each other in the circumferential direction so as to surround the outer circumferential surface of the other pipe 20 inserted into the connecting device body 110, and are disposed at an incline toward the other pipe 20. That is, the latching pieces 171 are disposed so as to gradually contract in the direction in which the other pipe 20 is inserted into the second body 124.

The edge of the grip ring 170 is interposed between the sleeve 173 and the fixing cap 163, and a portion of the grip ring 170 is inserted into the seating groove 165, whereby the grip ring 170 is disposed coaxially with the passage 111 in the connecting device body 110. Since the edge of the grip ring 170 is fitted between the sleeve 173 and the fixing cap 163, the grip ring 170 is stably maintained at a fixed position without moving within the connecting device body 110. When the end of the other pipe 20 is introduced into the connecting device body 110, the latching pieces 171 of the grip ring 170 are elastically deformed by close contact with the outer circumferential surface of the other pipe 20, thereby securely fixing the other pipe 20.

The grip ring 170 may be modified into any of various structures other than the structure shown in the drawings, so long as a plurality of latching pieces capable of being elastically deformed by close contact with the outer surface of the other pipe 20 is included.

The sleeve 173 includes a hollow sleeve body 174, the outer surface of which is capable of coming into contact with the inner surface of the connecting device body 110, and a ring-shaped sleeve inner rim portion 175, which protrudes from one end of the sleeve body 174 toward the interior of the sleeve body 174. The sleeve 173 is disposed in the sleeve seating portion 130 of the second body 124, and thus is stably maintained at a fixed position without moving within the second body 124. Since the sleeve inner rim portion 175 is brought into close contact with the sealing member 161, the sleeve 173 fixes the sealing member 161 so that the sealing member 161 is immovable. In addition, since the other end of the sleeve body 174 is brought into close contact with the edge of the grip ring 170, the sleeve 173 fixes the grip ring 170 together with the fixing cap 163 so that the grip ring 170 is immovable.

The sleeve 173 may be modified into any of various structures other than the structure shown in the drawings, so long as it is capable of being mounted in the connecting device body 110 and is capable of supporting the sealing member 161 and the grip ring 170.

Hereinafter, a process of interconnecting the pipe 10 and the other pipe 20 using the connecting device 100 for piping according to an embodiment of the present invention will be described.

Figure 6:
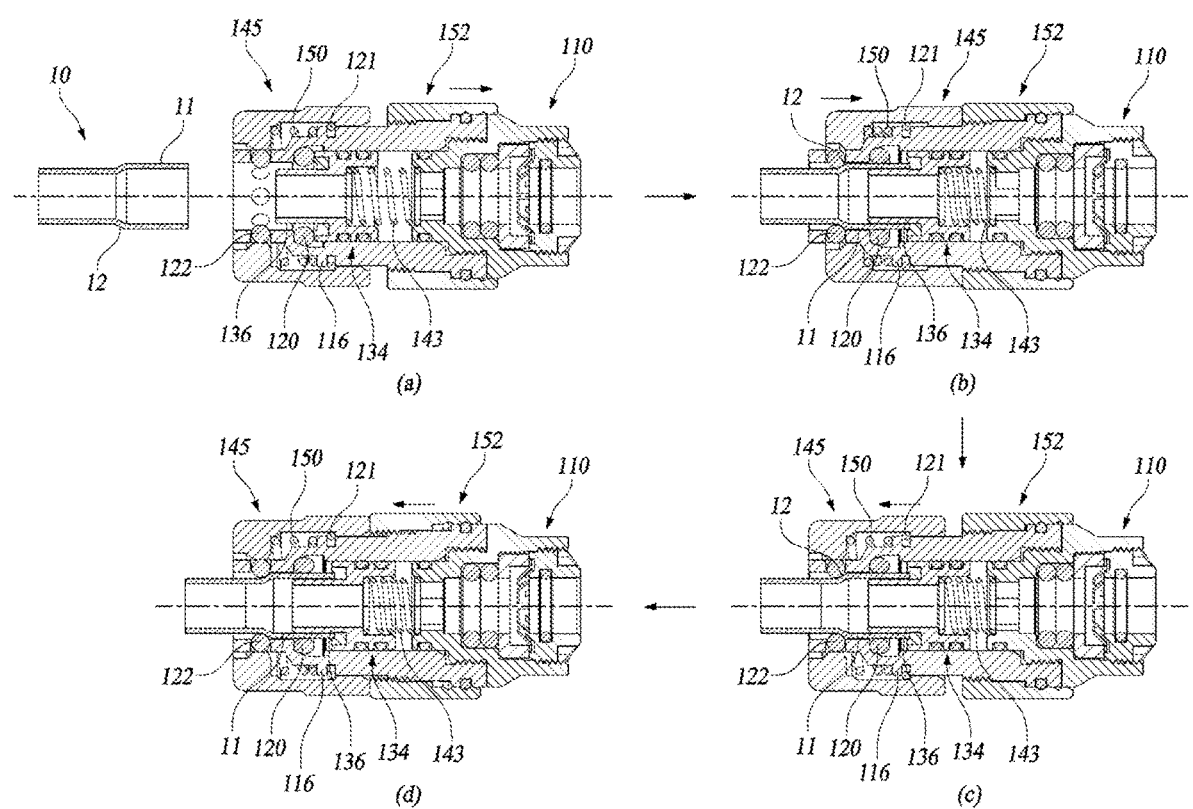
FIG. 6 is a view showing a process of connecting a pipe to a connecting device for piping according to an embodiment of the present invention.

A process of connecting the pipe 10 to the connection device 100 for piping is shown in FIG. 6.

First, as shown in FIG. 6(a), the stopper cap 152 is manipulated so as to be separated from the locking cap 145.

Subsequently, as shown in FIG. 6(b), in the state in which the locking cap 145 is pushed and separated from the balls 122, an expanded-pipe portion 11 of the pipe 10 is inserted into the connecting device body 110 through one end of the connecting device body 110. The balls 122 may be pushed in the outward direction of the connecting device body 110 in the state in which the locking cap 145 is separated from the balls 122. Accordingly, when the expanded-pipe portion 11 is pushed into the connecting device body 110, the balls 122 are pushed in the outward direction of the connecting device body 110, and thus the expanded-pipe portion 11 is easily inserted into the connecting device body 110. At this time, the plunger tube 136 of the plunger 134 is inserted into the pipe 10, the end of the pipe 10 is tightly pressed to the packing 139 of the plunger 134, and the plunger 134 is pushed toward the other end of the connecting device body 110. When the plunger 134 is pushed by the pipe 10, the plunger spring 143 applies elastic force to the plunger 134, and thus the packing 139 is brought into still closer contact with the end of the pipe 10.

Thereafter, as shown in FIG. 6(c), when the pressing force applied to the locking cap 145 is released, the locking cap 145 is returned to the original position thereof by the elastic force of the locking cap spring 150, and presses the balls 122 in the inward direction of the connecting device body 110. At this time, the balls 122 are brought into close contact with a stepped portion 12, which is formed at the rear end of the expanded-pipe portion 11 of the pipe 10, thereby fixing the pipe 10 so that the pipe 10 is not separated from the connecting device body 110.

Thereafter, as shown in FIG. 6(d), the stopper cap 152 is moved toward the locking cap 145 so as to be brought into contact with the end of the locking cap 145. At this time, the movement of the locking cap 145 is limited by the stopper cap 152, and thus the locking cap 145 is maintained in the state of pressing the balls 122 toward the interior of the connecting device body 110.

On the other hand, when the stopper cap 152 is moved away from the locking cap 145 and the locking cap 145 is moved to a position separated from the balls 122, the force of fixing the balls 122 to the pipe 10 is eliminated. In this state, it is possible to separate the pipe 10 from the connecting device body 110 merely by pulling the pipe 10.

Figure 7:
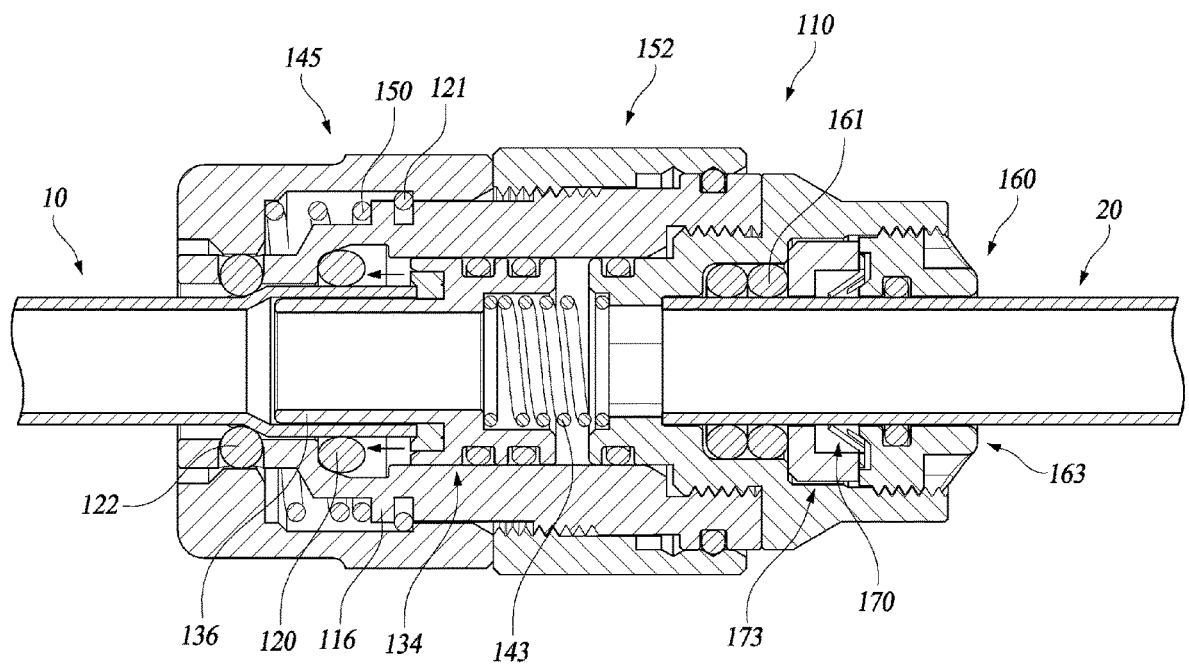
FIG. 7 is a cross-sectional view showing the state in which a pipe is connected to a connecting device for piping according to an embodiment of the present invention.

The other pipe 20 is capable of being easily coupled to the connecting device body 110 by being pushed into the connecting device body 110 through the other end of the connecting device body 110. That is, as shown in FIG. 7, when the other pipe 20 is pushed into the connecting device body 110 through the other end of the connecting device body 110, the grip ring 170 comes into close contact with the outer circumferential surface of the other pipe 20, thereby fixing the other pipe 20 so that the other pipe 20 is not separated from the connecting device body 110. At this time, the sealing members 161 and 168 come into close contact with the outer circumferential surface of the other pipe 20, and thus seal a gap between the other pipe 20 and the connecting device body 110.

As described above, the connecting device 100 for piping according to an embodiment of the present invention is capable of being easily and conveniently connected to the pipe 10 having the expanded-pipe portion 11 formed at one end thereof, and is capable of stably connecting the pipe 10 to the other pipe 20.

In addition, the connecting device 100 for piping according to an embodiment of the present invention is maintained in the state of being connected to the pipe 10 without the risk of leakage of fluid. That is, since the packing 139 is in close contact with the end of the pipe 10 in the state in which the plunger tube 136 of the plunger 134 is inserted into the pipe 10, it is possible to prevent leakage of fluid through a gap between the plunger 134 and the pipe 10. In addition, since the sealing member 120, which is disposed on the periphery of the plunger tube 136, is in close contact with the outer circumferential surface of the pipe 10, it is possible to prevent leakage of fluid through a gap between the connecting device body 110 and the pipe 10. Even if the fluid leaks due to incomplete coupling of the plunger 134 and the pipe 10, the leaked fluid presses the sealing member 120 in the direction of the arrow shown in FIG. 7. At this time, the sealing member 120 is brought into still closer contact with the sealing member seating portion 117 of the connecting device body 110, whereby it is possible to more securely prevent leakage of fluid to the outside.

Figure 8:
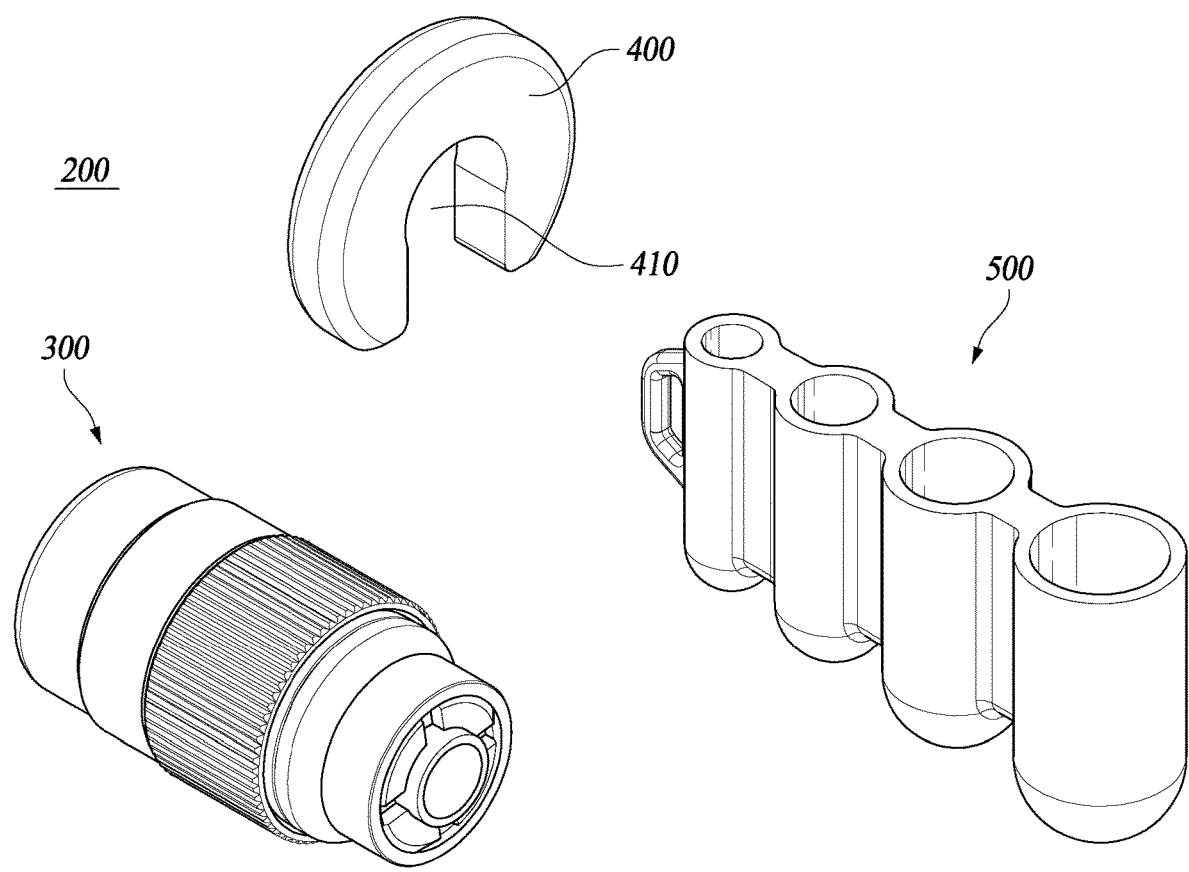
FIG. 8 is a view showing a connecting system for piping according to the present invention.
Figure 9:
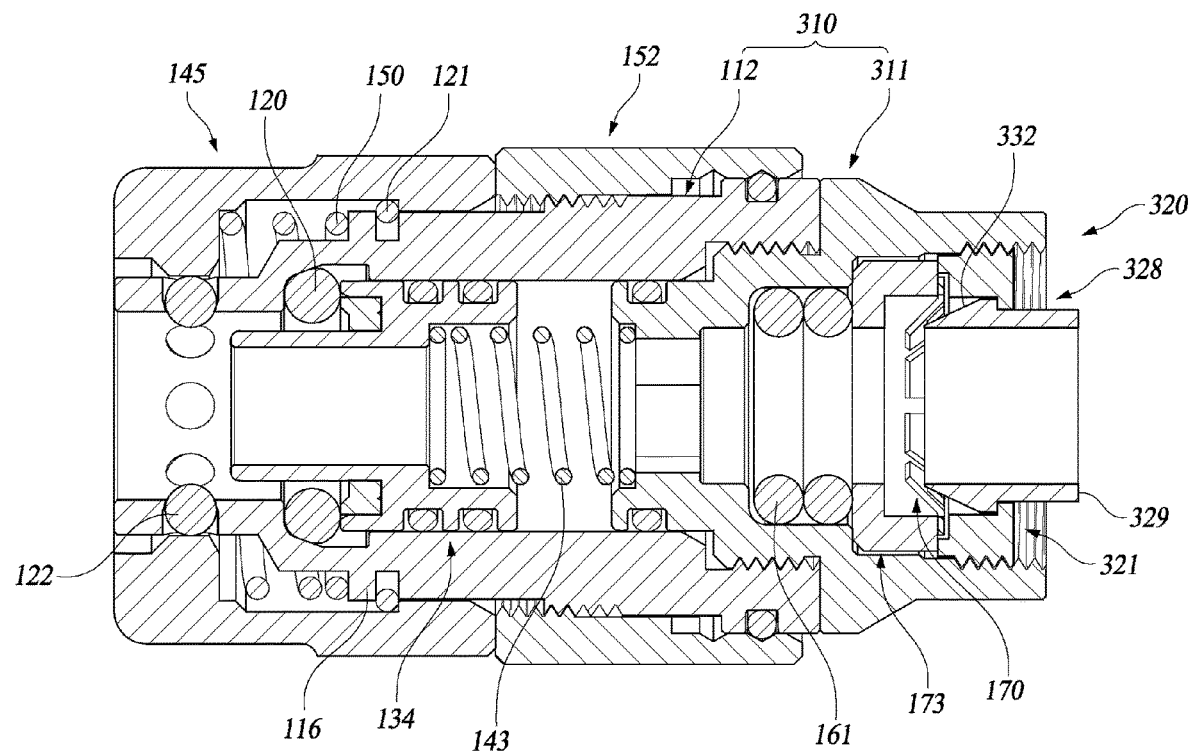
FIG. 9 is a cross-sectional view showing a connecting device for piping of the connecting system for piping shown in FIG. 8.
Figure 10:
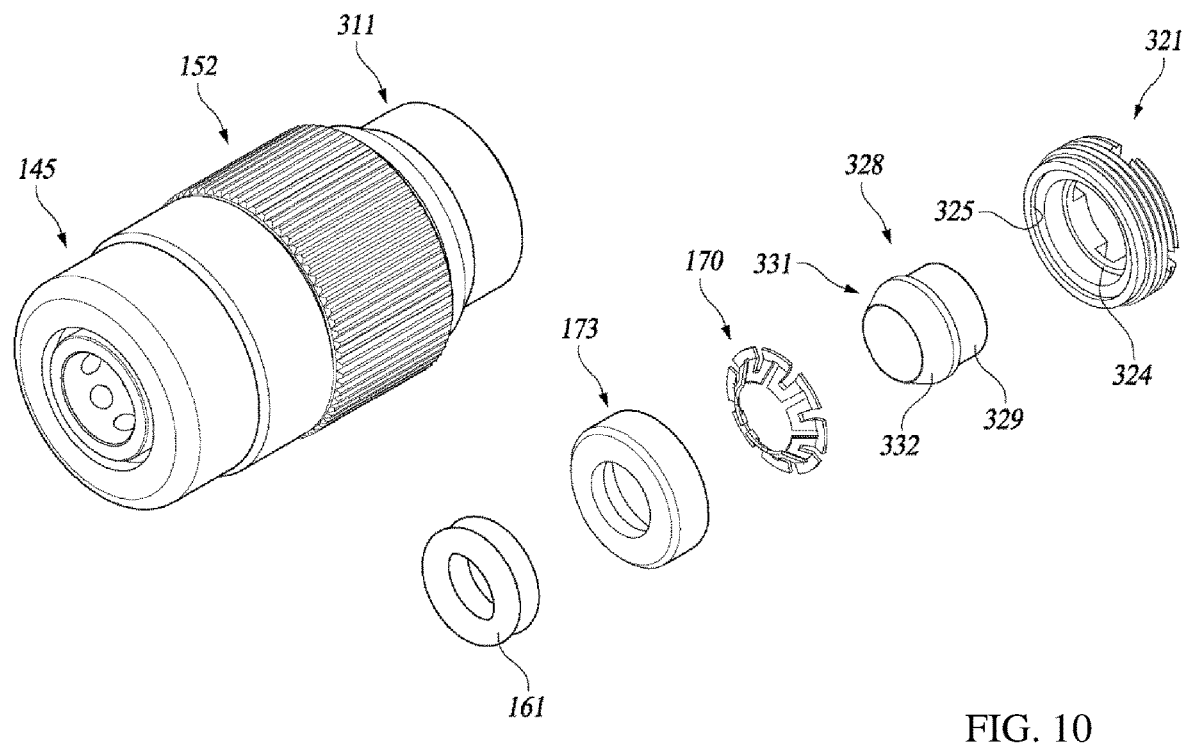
FIGS. 10 and 11 are exploded perspective views showing a connecting device for piping of the connecting system for piping shown in FIG. 8.
Figure 11:
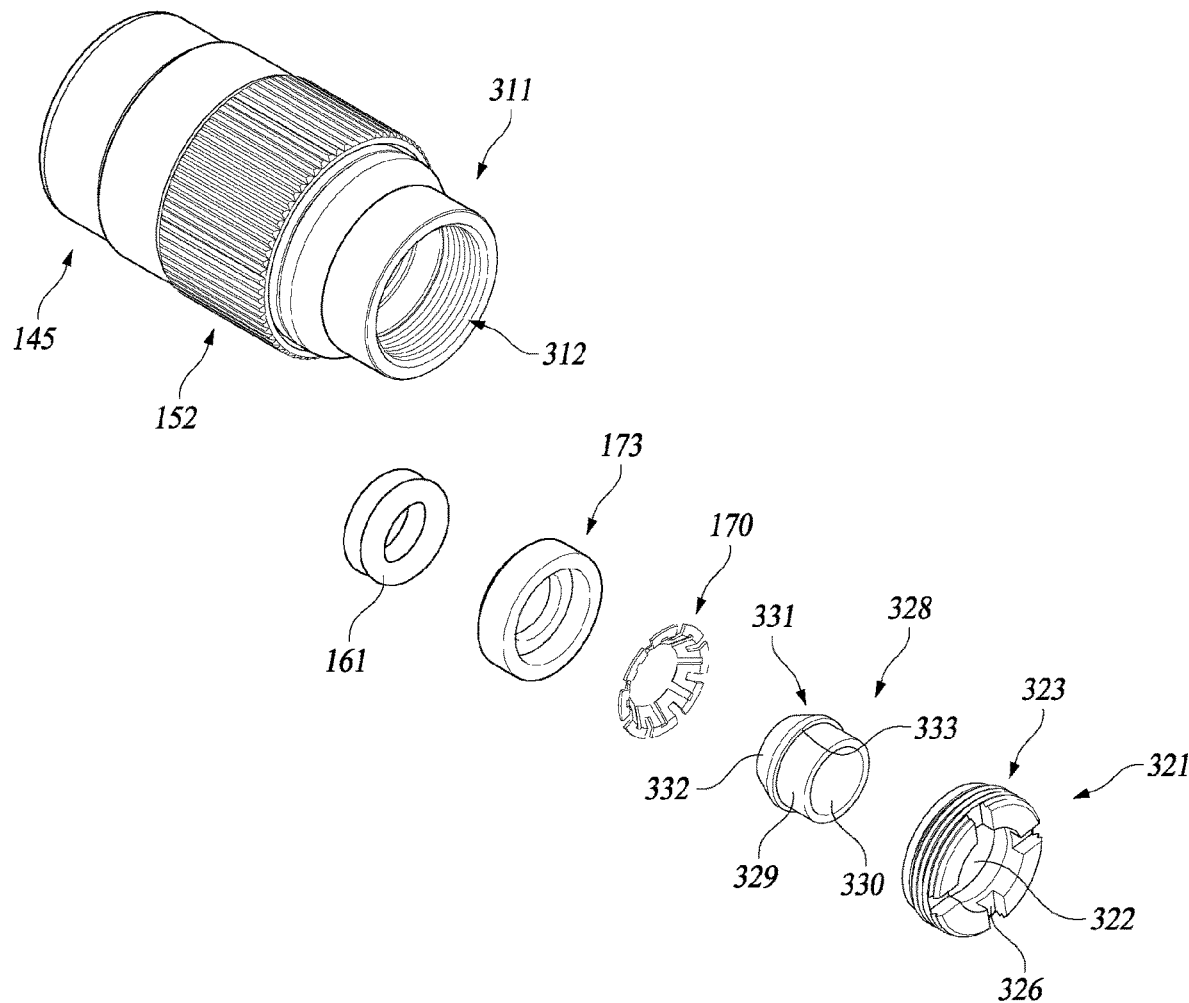

FIG. 8 is a view showing a connecting system 200 for piping including a connecting device 300 for piping according to another embodiment of the present invention.

The connecting system 200 for piping shown in FIG. 8 may connect the pipe 10 having the expanded-pipe portion 11 to the other pipe 20 or to another constituent part of piping. The connecting system 200 for piping includes a connecting device 300 for piping, a release handle 400, which is used to separate the other pipe 20 from the connecting device 300 for piping, and a marking support tool 500, which is used subsidiarily in the process of connecting the other pipe 20 to the connecting device 300 for piping.

Referring to FIGS. 8 to 11, the connecting device 300 for piping includes a connecting device body 310 having a hollow structure, a plunger 134, which is disposed in the connecting device body 310, a locking cap 145, which is coupled to the outer periphery of the connecting device body 310, a stopper cap 152, which is coupled to the outer periphery of the connecting device body 310, and a fixing unit 320, which is mounted in the connecting device body 310 in order to fix the other pipe 20, which is connected to the other end of the connecting device body 310. The plunger 134, the locking cap 145, and the stopper cap 152 are the same as those described above.

The connecting device body 310 includes a first body 112, to which the pipe 10 is coupled, and a second body 311, to which the other pipe 20 is coupled. The first body 112 is the same as that described above. The second body 311 is threadedly engaged with the first body 112, and is threadedly engaged with a fixing cap 321 of the fixing unit 320. Most of the components of the second body 311 are the same as those of the second body 124 described above.

The fixing unit 320 includes a sealing member 161, a fixing cap 321, a grip ring 170, a sleeve 173, and a release tube 328. The sealing member 161, the grip ring 170, and the sleeve 173 are the same as those described above.

The fixing cap 321 has a hollow structure in which a fixing cap through-hole 322, through which the other pipe 20 passes, is formed. The fixing cap 321 has a fixing cap threaded portion 323 formed on the outer surface thereof so as to mesh with a second body inner threaded portion 312 of the second body 311. The fixing cap 321 may be threadedly engaged with the connecting device body 310. The fixing cap 321 has a fixing cap stepped portion 324 formed therein, on which the release tube 328 is caught. The fixing cap 321 has a seating groove 325 formed in an end thereof to allow a portion of the grip ring 170 to be inserted thereinto.

The fixing cap 321 has a plurality of fixing cap recesses 326 formed in the outer surface thereof. The fixing cap recesses 326 are arranged in the circumferential direction of the fixing cap 321 so as to be spaced apart from each other with a regular interval therebetween. A dedicated manipulation tool for fixing the fixing cap 321 to the second body 311 may be inserted into the fixing cap recesses 326. The fixing cap 321 may be assembled with or disassembled from the second body 311 using the dedicated manipulation tool, which is formed so as to mesh with the fixing cap recesses 326.

The release tube 328 includes a hollow release tube body 329, in which a release tube through-hole 330 through which the other pipe 20 passes is formed, and a pressing portion 331, which is formed at one end of the release tube body 329. The outer diameter of the release tube body 329 is greater than the outer diameter of the other pipe 20, which is inserted into the connection device body 310. The inner diameter of the release tube body 329 may be equal to or similar to the outer diameter of the other pipe 20 so that the other pipe 20 is capable of passing through the release tube body 329. The pressing portion 331 is formed in the shape of a tapered ring that is gradually reduced in diameter in a direction moving away from the release tube body 329. That is, the pressing portion 331 has an inclined surface 332 with which latching pieces 171 of the grip ring 170 come into contact. A latching portion 333 is formed at the connection portion between the release tube body 329 and the pressing portion 331 so as to protrude from the outer surface of the release tube body 329. The release tube 328 coupled to the fixing cap 321 is not capable of being separated from the fixing cap 321 because the latching portion 333 is caught on the fixing cap stepped portion 324 of the fixing cap 321.

The release tube 328 is linearly movable parallel to the direction in which the other pipe 20 is inserted into the connection device body 310. One end of the release tube body 329 protrudes from the fixing cap 321 to the outside. When the user presses the release tube 328 in the direction in which the release tube 328 is inserted into the connecting device body 310, the pressing portion 331 may come into contact with the latching pieces 171. At this time, the pressing portion 331 may press the latching pieces 171, which are in close contact with the outer surface of the pipe 20, and may elastically deform the latching pieces 171 in a direction moving away from the outer surface of the pipe 20. Due to this operation of the release tube 328, the force by which the grip ring 170 fixes the pipe 20 is eliminated, and thus the pipe 20 may be easily separated from the connecting device body 310.

The structure or the arrangement of the release tube body 329, the pressing portion 331, and the latching portion 333, which constitute the release tube 328, may be variously changed.

Figure 14:
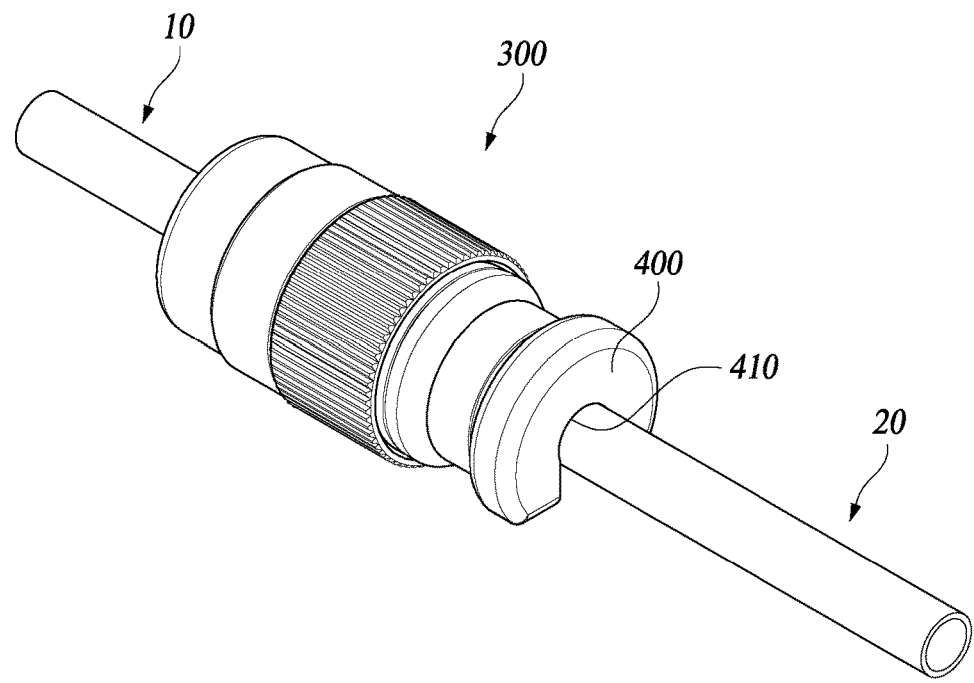
FIGS. 14 and 15 are views showing a process of removing a pipe from a connecting device for piping of the connecting system for piping shown in FIG. 8.
Figure 15:
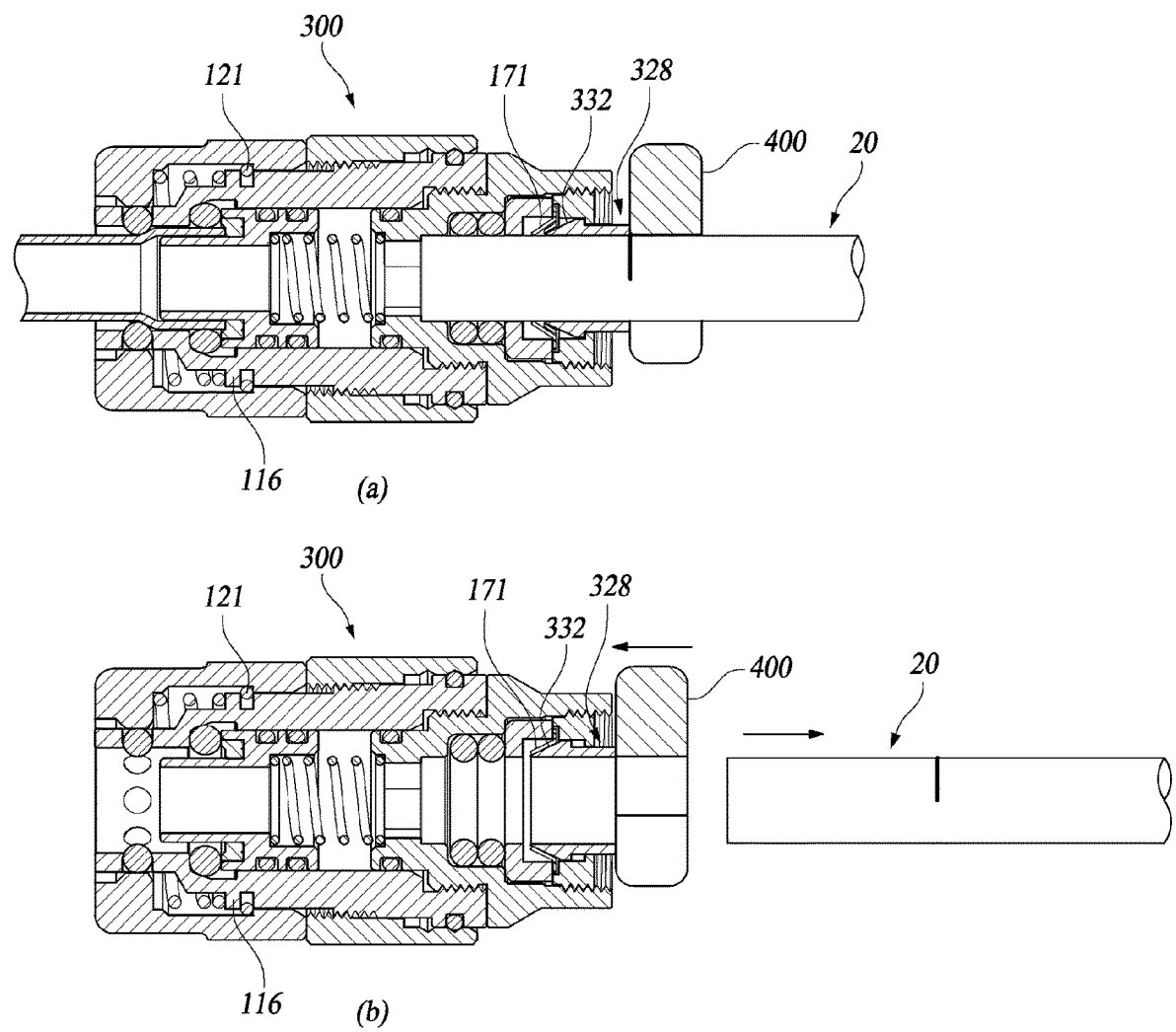

The release handle 400 may be used to move the release tube 328 in order to separate the other pipe 20, which is coupled to the connecting device 300 for piping, from the connecting device 300 for piping. The release handle 400 has an opening 410 formed therein to allow the pipe 20 to be inserted thereinto. The opening 410 is formed in a portion of the edge of the release handle 400 so as to be open to the outside. As shown in FIGS. 14 and 15, the release handle 400 may be removably coupled to the other pipe 20 in the manner in which the other pipe 20 is inserted into the opening 410. In the state in which the release handle 400 is coupled to the pipe 20, when the user presses the release handle 400 toward the connecting device 300 for piping, the release handle 400 pushes the release tube 328 in the direction in which the release tube 328 is inserted into the connecting device body 310. At this time, the force by which the grip ring 170 fixes the pipe 20 is eliminated, and thus the pipe 20 is capable of being separated from the connecting device 300 for piping.

The release handle 400 may be modified into any of various structures other than the structure shown in the drawings, so long as it is capable of pressing the release tube 328.

Figure 13:
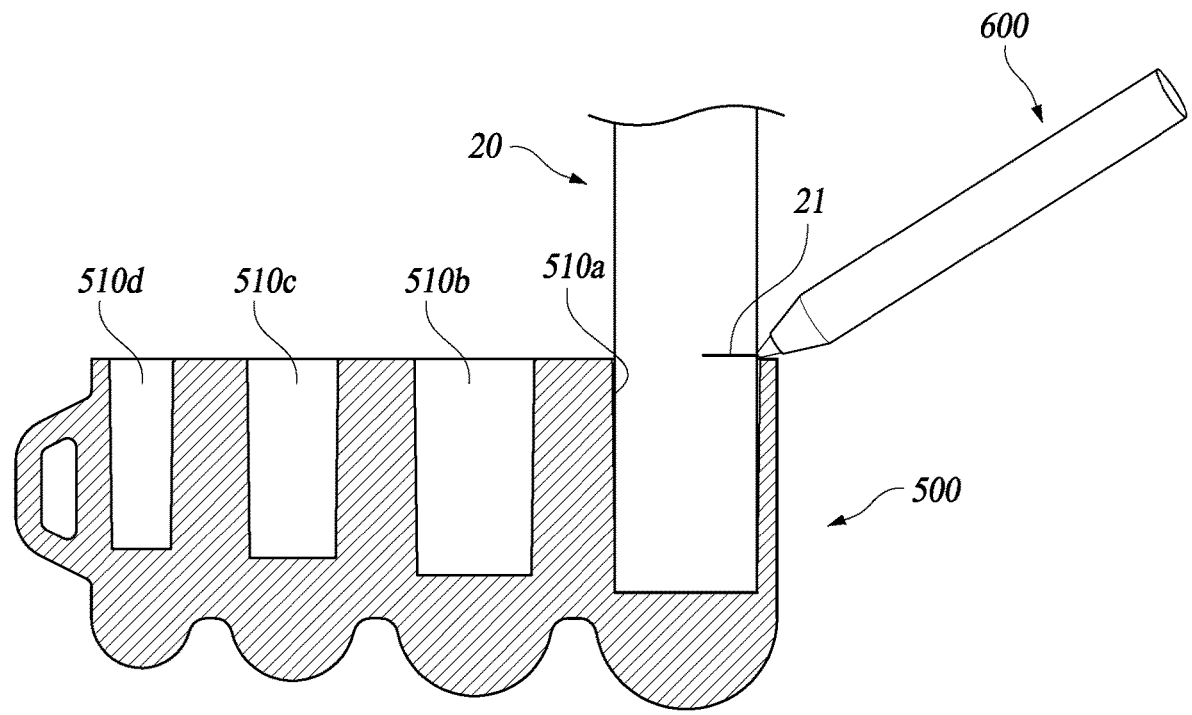
FIG. 13 is a view showing a method of making a mark on a pipe using a marking support tool of the connecting system for piping shown in FIG. 8.

Referring to FIGS. 8 and 13, the marking support tool 500 is subsidiarily used in the process of connecting the other pipe 20 to the connecting device 300 for piping. The marking support tool 500 has a plurality of pipe insertion holes 510a, 510b, 510c and 510d formed therein to allow a pipe, which is to be connected to the connecting device 300 for piping, to be removably inserted thereinto.

In the process of connecting the pipe 20 to the connecting device 300 for piping, it is difficult for the user to check with the naked eye whether the pipe 20 has been inserted into the connecting device body 310 to a sufficient depth. The insertion depth that ensures stable coupling between the pipe 20 and the connecting device 300 for piping is determined depending on the structure of the connecting device 300 for piping. Accordingly, if the insertion depth of the pipe 20, which is to be inserted into the connecting device 300 for piping, is marked on the outer surface of the pipe 20, the process of connecting the pipe 20 to the connecting device 300 for piping may be further facilitated.

Figure 12:
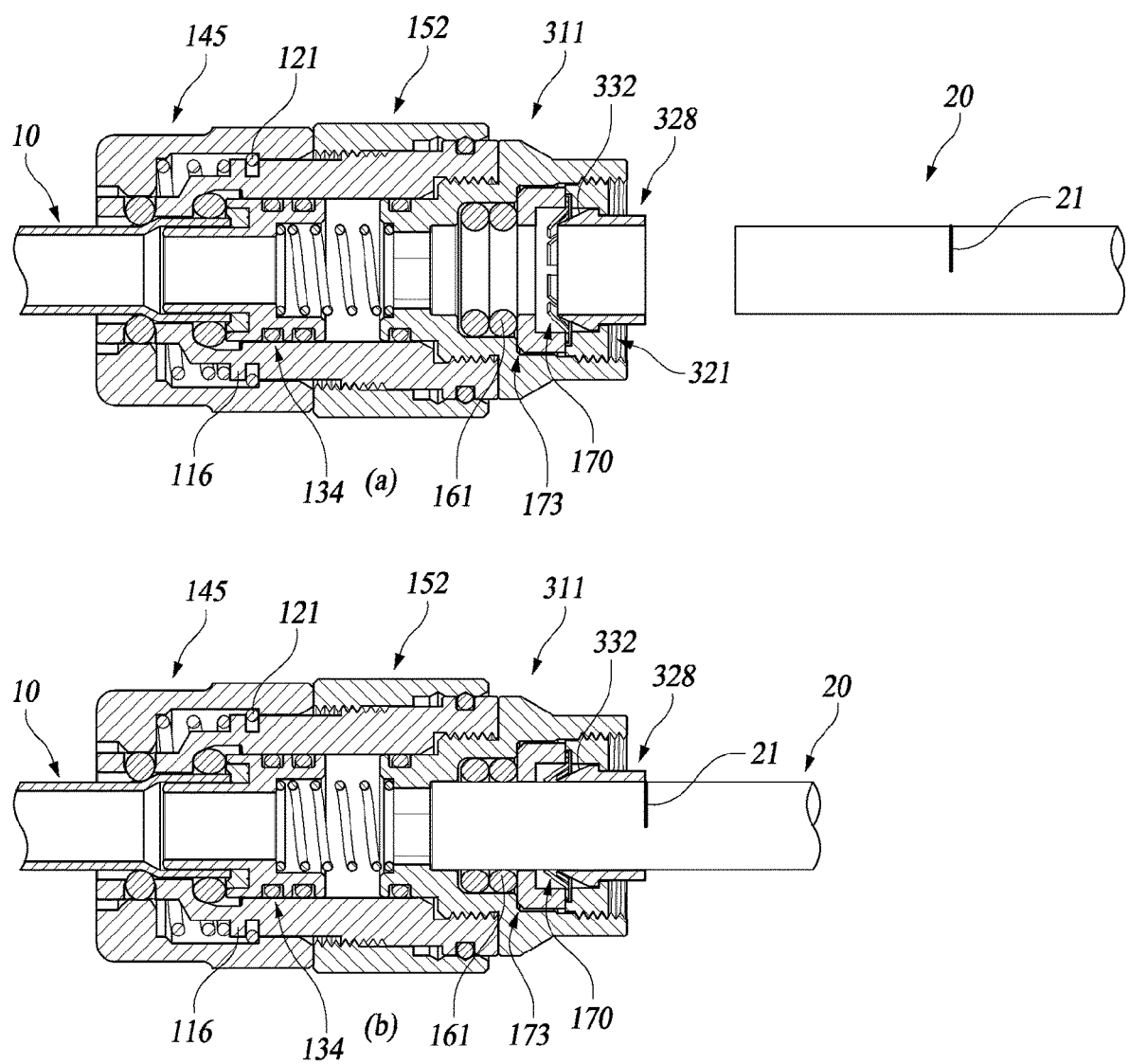
FIG. 12 is a view showing a process of connecting a pipe to a connecting device for piping of the connecting system for piping shown in FIG. 8.

That is, as shown in FIGS. 12(a) and 12(b), when a mark 21 is made on the outer surface of the pipe 20 at a position spaced apart from the end of the pipe 20 by a distance equivalent to the insertion depth of the pipe 20, the user only needs to push a portion of the pipe 20 from the end of the pipe 20 to the point at which the mark 21 is made into the connecting device 300 for piping. When the portion of the pipe 20 from the end of the pipe 20 to the point at which the mark 21 is made is introduced into the connecting device 300 for piping, the connecting device 300 for piping and the pipe 20 may be firmly coupled to each other.

It is possible to conveniently make the mark 21 on the pipe 20 using the marking support tool 500. That is, as shown in FIG. 13, the user may insert the pipe 20 into one 510a of the pipe insertion holes 510a, 510b, 510c and 510d, which matches the connecting device 300 for piping, and may make the mark 21 on the outer surface of the pipe 20 using a marker 600. The depth of the pipe insertion hole 510a is the same as the insertion depth of the pipe 20 that is to be inserted into the connecting device 300 for piping.

The pipe insertion holes 510a, 510b, 510c and 510d may be formed to have different respective diameters and depths. For example, the pipe insertion holes 510a, 510b, 510c and 510d may be formed such that the greater the dimeter, the greater the depth. The pipe insertion holes 510a, 510b, 510c and 510d may be formed to have various diameters and depths so as to match various connecting devices for piping, which are used to interconnect pipes having various sizes.

The marking support tool 500 may be modified into any of various structures other than the structure shown in the drawings, so long as it has therein pipe insertion holes into which a pipe, which is to be connected to the connecting device 300 for piping, is capable of being removably inserted. The number of pipe insertion holes formed in the marking support tool 500 may be variously changed.

Hereinafter, a method of using the connecting system 200 for piping according to the present invention will be described.

The method of connecting the pipe 10 having the expanded-pipe portion 11 to the connecting device 300 for piping is the same as that described above.

A method of connecting the other pipe 20 to the connecting device 300 for piping will now be described.

First, as shown in FIG. 13, the mark 21, which indicates the insertion depth of the other pipe 20, is made on the outer surface of the other pipe 20 using the marking support tool 500.

Thereafter, as shown sequentially in FIGS. 12(a) and 12(b), the pipe 20 on which the mark 21 has been made is inserted into the connecting device 300 for piping. When the pipe 20 is pushed into the connecting device 300 for piping through the release tube through-hole 330 such that the mark 21 is located at the end of the release tube 328, the pipe 20 may be firmly coupled to the connecting device 300 for piping. At this time, the latching pieces 171 of the grip ring 170 are in close contact with the outer circumferential surface of the pipe 20, and thus the pipe 20 is fixed to the connecting device 300 for piping so as not to be easily separated therefrom. Further, the sealing member 161 comes into close contact with the outer surface of the pipe 20, thereby sealing a gap between the connecting device 300 for piping and the pipe 20.

On the other hand, the method of separating the pipe 20, connected to the connecting device 300 for piping, from the connecting device 300 for piping will now be described.

First, as shown in FIG. 15(a), the release handle 400 is coupled to the pipe 20.

Thereafter, as shown in FIG. 15(b), when the release handle 400 is pressed toward the connecting device 300 for piping, the release handle 400 pushes the release tube 328 in the direction in which the release tube 328 is introduced into the connecting device body 310. At this time, the pressing portion 331 of the release tube 328 presses the latching pieces 171, which are in close contact with the outer surface of the pipe 20, and elastically deforms the latching pieces 171 in a direction moving away from the outer surface of the pipe 20. Accordingly, the force by which the grip ring 170 fixes the pipe 20 is eliminated. In this state, when the pipe 20 is pulled, the pipe 20 is capable of being easily separated from the connecting device 300 for piping. Since the pressing portion 331 is formed in the shape of a tapered ring that is gradually reduced in diameter, when the release tube 328 is pressed by the release handle 400, the pressing portion 331 is capable of stably and elastically deforming the latching pieces 171.

The connecting device 300 for piping according to the embodiment enables the pipe 20 to be easily coupled thereto in a one-touch insertion manner.

In addition, the connecting device 300 for piping according to the embodiment enables the pipe 20 connected thereto to be easily separated therefrom. Accordingly, it is possible to easily and conveniently replace the pipe 20 without performing a bothersome task of, for example, disassembling some components of the connecting device 300 for piping.

Although preferred embodiments of the present invention have been described, the scope of the present invention is not limited to the foregoing description made with reference to the accompanying drawings.

For example, although the connecting device for piping according to the present invention has been described above as being used to interconnect the pipe 10 having the expanded-pipe portion 11 formed at one end thereof and the other pipe 20, the connecting device for piping according to the present invention may be used to connect pipes having various shapes to another pipe or to another constituent part of piping.

In addition, the connecting device for piping according to the present invention may be modified into any of various other structures such as, for example, an elbow-type structure or a T-shaped structure.

As is apparent from the above description, a connecting device for piping according to the present invention is capable of being easily and conveniently connected to a pipe, and is also capable of stably connecting a pipe to another pipe or to another constituent part of piping.

In addition, a connecting device for piping according to the present invention is capable of reliably maintaining airtightness in the state of being connected to a pipe.

However, the effects achievable through the invention are not limited to the above-mentioned effects, and other effects not mentioned herein will be clearly understood by those skilled in the art from the above description.

Although preferred embodiments of the present invention have been illustrated and described in order to exemplify the principle of the present invention, the present invention is not limited to the specific embodiments. It will be understood that various modifications and changes can be made by those skilled in the art without departing from the spirit and scope of the invention as defined by the appended claims.

What is claimed is:

1. A connecting device for piping configured to connect a pipe to another pipe or to another constituent part of piping, the connecting device for piping comprising:
    a connecting device body having a hollow structure, the connecting device body comprising a passage formed therein to allow a fluid to pass therethrough, a plurality of ball insertion holes formed in one end thereof, and a latching protrusion formed on an outer periphery thereof;
    a separation prevention ring supported by the latching protrusion of the connecting device body;
    a plurality of balls inserted into the ball insertion holes such that a portion of each of the plurality of balls protrudes to an interior of the connecting device body, each of the plurality of balls having a size that does not allow the plurality of balls to completely pass through the ball insertion holes so that the plurality of balls comes into close contact with an outer surface of a pipe that is coupled to the one end of the connecting device body;
    a locking cap comprising a locking cap body having a hollow structure that surrounds a portion of the connecting device body and is movably coupled to the connecting device body, a pressing rim portion formed inside the locking cap body so as to press the plurality of balls toward the interior of the connecting device body, an inner rim portion protruding toward an interior of the locking cap body so as to be caught on the separation prevention ring and to be prevented from being separated from the connecting device body, and a locking cap stepped portion;
    a locking cap spring supported at one end thereof by the latching protrusion of the connecting device body and being in contact at a remaining end thereof with the locking cap stepped portion of the locking cap so as to press the locking cap toward a position at which the locking cap contacts the plurality of balls;
    a stopper cap movably coupled to the connecting device body while surrounding a portion of the connecting device body so as to limit movement of the locking cap through contact with the locking cap;
    a plunger comprising a plunger body having a hollow structure that is movably disposed in the connecting device body, a plunger tube protruding from the plunger body so as to be inserted into a pipe that is coupled to the one end of the connecting device body, and a packing disposed on a periphery of the plunger tube so as to come into contact with an end of the pipe;
    a plunger spring mounted in the connecting device body to press the plunger toward the pipe that is coupled to the one end of the connecting device body;
    a sealing member disposed on the periphery of the plunger tube to seal a gap between the pipe that is coupled to the plunger tube and the connecting device body; and
    a sealing member disposed on an outer surface of the plunger body to seal a gap between the connecting device body and the plunger body.

2. The connecting device for piping according to claim 1, wherein the stopper cap is threadedly engaged with the connecting device body.

3. The connecting device for piping according to claim 1, wherein the connecting device body comprises:
    a first body configured to allow the plurality of balls, the locking cap, the locking cap spring, the stopper cap, and the plunger to be coupled thereto; and
    a second body coupled to an end of the first body, the second body being configured to allow a fixing unit, configured to fix the other pipe or the other constituent part of piping to the connecting device body, to be coupled thereto.

4. The connecting device for piping according to claim 1, further comprising:
    a fixing unit mounted to a remaining end of the connecting device body to fix the other pipe or the other constituent part of piping to the connecting device body,
    wherein the fixing unit comprises:
    a fixing cap having a fixing cap through-hole formed therein to allow the other pipe or the other constituent part of piping to pass therethrough, the fixing cap being fixed to the connecting device body;
    a sealing member disposed in the connecting device body so as to be in contact with an outer surface of the other pipe or the other constituent part of piping;
    a grip ring disposed in the connecting device body, the grip ring comprising a plurality of latching pieces formed so as to be elastically deformed by contact with the outer surface of the other pipe or the other constituent part of piping in order to fix the other pipe or the other constituent part of piping to the connecting device body; and
    a release tube having a release tube through-hole formed therein to allow the other pipe or the other constituent part of piping to pass therethrough, the release tube being movably inserted into the fixing cap through-hole so as to press the plurality of latching pieces in a direction moving away from the outer surface of the other pipe or the other constituent part of piping.

5. The connecting device for piping according to claim 4, wherein the release tube comprises:
    a release tube body; and a pressing portion formed at one end of the release tube body, the pressing portion being gradually reduced in diameter in a direction moving away from the release tube body so as to press the plurality of latching pieces.

6. The connecting device for piping according to claim 5, wherein the release tube further comprises a latching portion protruding from an outer surface of the release tube body, and wherein the fixing cap comprises therein a fixing cap stepped portion on which the latching portion is caught so that the release tube is prevented from being separated from the fixing cap.

\* \* \* \* \*